H. V. LOUGH.
POWER TRANSMITTING DEVICE.
APPLICATION FILED AUG. 31, 1920.
1,409,222.
Patented Mar. 14, 1922.
2 SHEETS—SHEET 1.
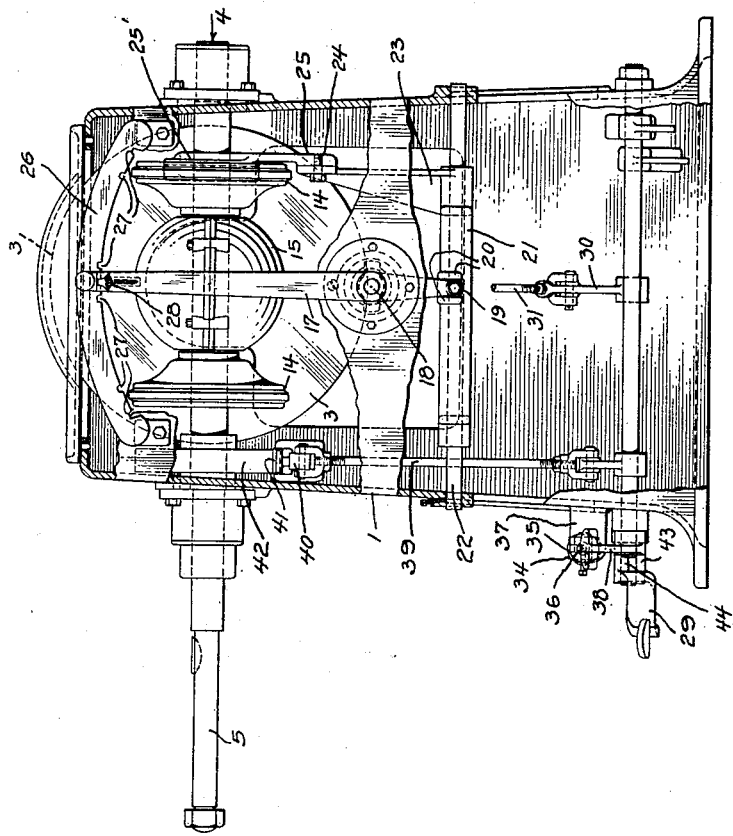
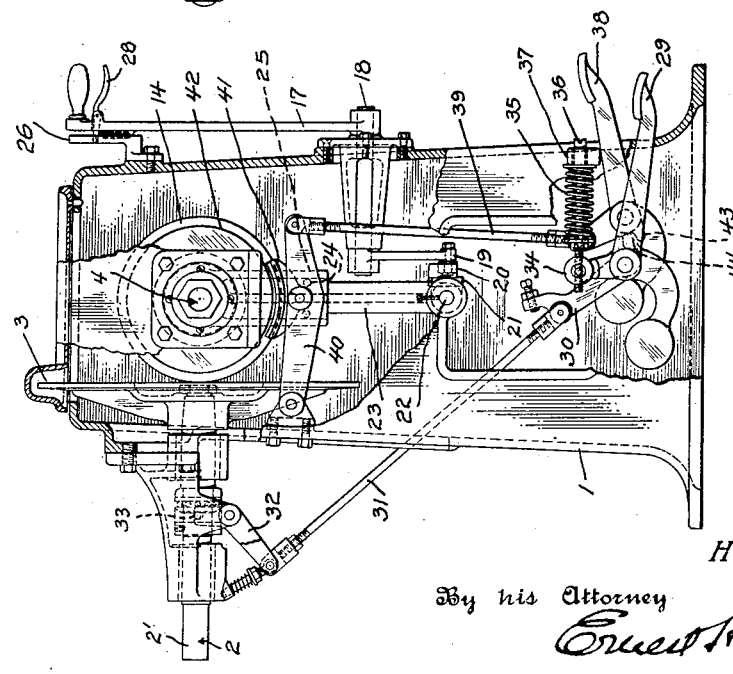
Inventor
Hector V. Lough
By his Attorney
Ernest Hopkinson

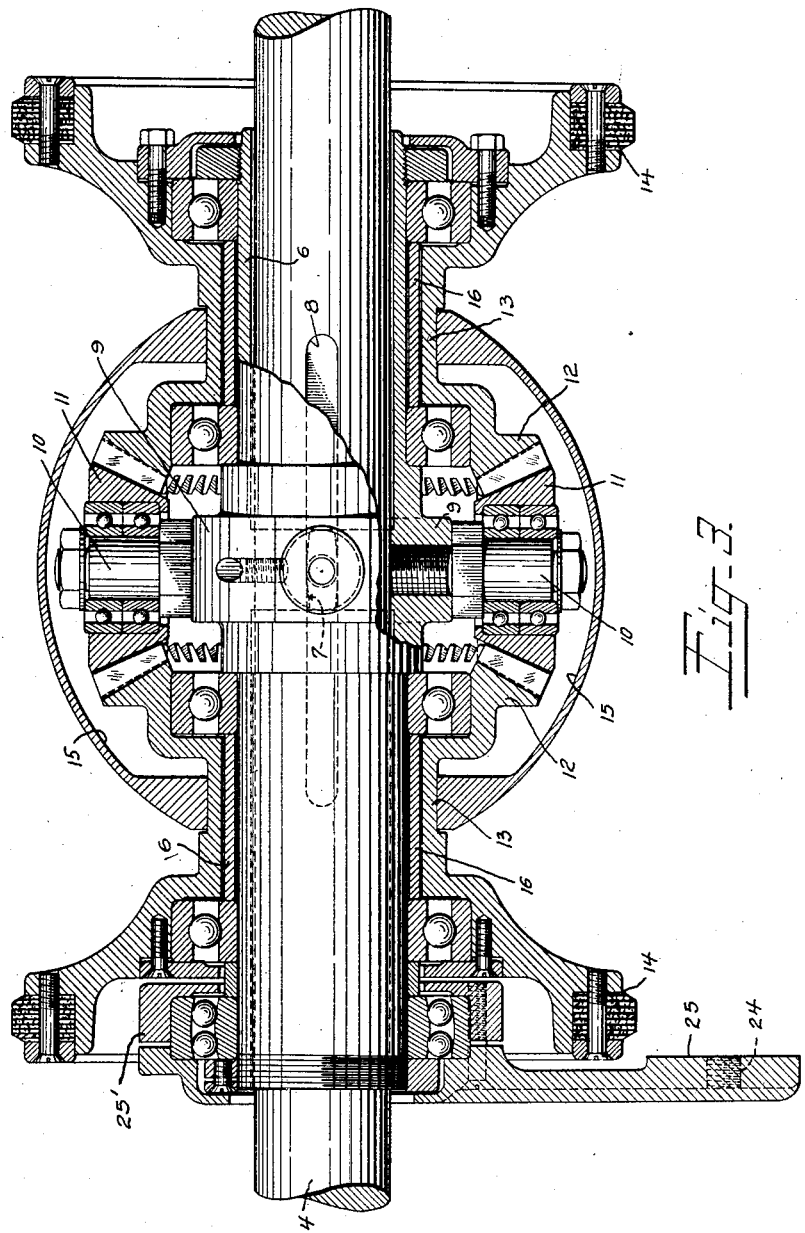

UNITED STATES PATENT OFFICE.

HECTOR V. LOUGH, OF HARTFORD, CONNECTICUT, ASSIGNOR TO THE HARTFORD RUBBER WORKS COMPANY, A CORPORATION OF CONNECTICUT.

POWER-TRANSMITTING DEVICE.

1,409,222.　　　Specification of Letters Patent.　　Patented Mar. 14, 1922.

Application filed August 31, 1920. Serial No. 407,083.

*To all whom it may concern:*

Be it known that I, HECTOR V. LOUGH, a subject of the King of Great Britain, residing at Hartford, county of Hartford, State of Connecticut, have invented certain new and useful Improvements in Power-Transmitting Devices, of which the following is a full, clear, and exact description.

This invention relates to power transmitters, and particularly to a form thereof suitable for driving the drum of a tire building machine such as is disclosed in a patent to Ernest Hopkinson, 1,310,701, granted July 22, 1919.

In the manufacture of pneumatic tires by what is known as the Hopkinson process in which the carcass is built up of a number of plies of fabric in "pulley band" form, it has been found desirable to rotate the drum sometimes in one direction and sometimes in the opposite direction, and in either case at different speeds.

The present invention aims to provide a power transmitting device of a construction suitable for rotating the shaft and a building drum thereon in either direction and at a speed convenient for the operator to manipulate the component parts of a tire carcass which is being built. The invention further aims to provide a power transmitting mechanism that may be intermittently coupled and uncoupled from a source of power to permit the building drum to "coast" or run free at certain times during the building up operations.

With the illustrated embodiment of the invention in mind and without intention to unnecessarily limit its scope, the invention briefly may be described as consisting of a driving disk that is adapted to rotate a shaft in either direction and at any suitable speed through differential gearing that operatively connects a quill loosely feathered to the shaft and a pair of friction wheels contacting with the disk on opposite sides of its center, the quill, which carries the differential gearing and the friction wheels, being shiftable to vary the contact points of the friction wheels with the driving disk.

The preferred embodiment of the invention is illustrated in the accompanying drawings in which:

Fig. 1 is a side elevation, partly in section, of a tire building machine of the pulley band type equipped with the transmitting device of the present invention;

Fig. 2 is a front elevation, also in section, of the same further showing the relation of the various parts; and Fig. 3 is a detailed cross section of the differential gear assembly and associated mechanism.

Within the frame 1 on the end of a stub shaft 2 is the constant speed driving member of the transmitter in the form of a disk 3, the projecting free end 2' of the shaft being adapted to receive a belt pulley or other suitable device for rotating the shaft.

Located in axial intersecting relation with the disk and suitably journaled in opposite sides of the frame 1 is a main shaft 4 having a free projecting end or arbor portion 5 that is adapted to support a tire building drum such as shown in the previously mentioned patent, but other desired instrumentalities might be supported thereon. The shaft 4 is driven in either direction and at any suitable speed by a friction differential mechanism whose components are operatively supported by a quill 6, Fig. 3, feathered to the shaft by a short and slightly rounded key 7 in a slot 8, the quill being consequently incapable of revolving without turning the shaft 4 also but having a limited independent rocking movement, thereby equalizing the driving pressure of two friction wheels 14, subsequently to be described.

A center enlargement or boss 9 of the quill carries a plurality of studs 10 (preferably two at 180° to one another) on which beveled pinions 11 are free to be turned by intermeshing beveled gears 12 which are fixed by their hubs 13 to friction faced wheels 14 fixedly spaced apart to traction against the disk 3 at opposite sides of its center.

About the differential gearing 11 and 12 a split housing 15 may be clamped if desired. Suitable anti-friction devices may be provided as indicated to permit of the necessary independent rotation of the parts of the differential relative to the quill and likewise also spacing collars 16 may be utilized.

From the above it will be clear that with the disk 3 in engagement with the friction wheels 14 the shaft 4 will be rotated in a direction and at a speed depending upon the position of the friction wheels relative to the axis of the disk. When the wheels are equal distances from the axis of the disk there will be no rotation of the shaft 4, for the reason that their respective gears 12 moving at the same rate in opposite directions will merely turn the pinions 11 about the studs 10 without compelling the latter to move. But when the friction wheels are moved so that they contact with the disk 3 at different distances from its center, the shaft 4 will be rotated at a speed equal to half the difference of their angular velocities and in the same direction as the more rapidly rotating wheel. The action is the same as if one of the gears 12 was stationary and the other movable at an angular velocity equal to their difference (when both are moving), the studs 10, of course, moving at half the angular velocity of the moving gear 12.

The friction wheels 14 may be shifted by any suitable mechanism, convenient means for that purpose being shown in Fig. 2 as comprising a lever 17 fulcrumed at 18 and having its lower free end 19 arranged between fingers 20 integral with a sleeve 21 slidable on a rod 22 and carrying an arm 23 that is secured at 24 to the projection 25 of a split collar 25′ loosely secured to the quill 6. An arcuate bar 26 mounted on the frame 1 is provided with suitable notches 27 for the reception of a spring detent 28 which is mounted on the lever 17 and serves to hold the friction wheels 14 in any adjusted position.

To establish or discontinue the drive, the disk 3 is moved to and from the friction wheels 14 and while any convenient means may be employed to move the disk axially it is preferred to do so through a treadle or foot-lever 29 having a plurality of arms one of which, 30, is connected by a link 31 to a bell crank 32 with slotted ends engaging diametrically disposed pins 33 of an anti-friction collar suitably mounted on the shaft 2. In Fig. 1 the treadle is shown with the toggle members 31 and 30 substantially in line and a second arm 34 of the foot lever appears in a position bringing into play a cushion stop in the form of a spring 35 encircling a rod 36 loosely penetrating a hole in a fixed lug 37. This cushion stop arrests downward movement of the treadle when the toggle is straight and the driving pressure between the disk and friction wheels the greatest. Further downward movement of the treadle from the position shown in Fig. 1 permits the shaft 4 to run free. This extra movement of the foot treadle is of course against the force of the spring 35. The operator may by momentarily depressing and relieving the treadle turn the drum on shaft 4 positively or by its own momentum to suit the exacting tasks pursued in plying up fabric to form a tire carcass.

If desired, but not necessarily, a treadle 38, connected through a link 39 to a lever 40 carrying a brake shoe 41 may be provided to arrest movement of the shaft 4 by pressure against a brake wheel 42 fast on the shaft 4. Preferably, also the treadle 38 is provided with an ear 43 which is adapted to coact with a similar ear 44 on foot lever 29 and lift the same to discontinue the friction drive prior to the application of the shoe to the brake wheel.

From the foregoing description of the invention it will be obvious that I have provided a power transmitting device that is efficient in construction and easy to operate, being particularly advantageous for tire building machines where the speed requirements are variable and where the operator desirably may control both the angular velocity and the direction of movement of a building drum without the use of his hands which must be free to manipulate the materials being incorporated into a tire carcass. It is to be understood that the invention is not limited in application to use on tire building machines and in construction to the precise details shown and described, excepting as pointed out in the claims to which reference is made for an understanding of the scope of the invention.

Having thus described my invention, what I claim and desire to protect by Letters Patent is:

1. A power transmitter having in combination a driving member, a pair of driven members, means for relatively shifting the driving and driven members, a shaft, a differential mechanism between the shaft and the driven members for transmitting motion from the driving member to the shaft, and means for equalizing the pressure between the driven and the driving members.

2. A power transmitter having in combination a driving member, a spaced apart pair of driven members, means for engaging and disengaging the driving and driven members, a shaft, and means between the shaft and the driven members for transmitting motion from the driven members to the shaft including a differential mechanism rockably splined to said shaft.

3. A power transmitter having in combination a one-way rotatable disk, a shaft axially in intersecting relation therewith, a quill feathered to said shaft and shiftable axially relative thereto, and means operatively interconnecting said quill and disk for rotating the shaft from the disk in either direction and at any desired speed, said means including friction wheels engageable edgewise with said disk, sets of differential gears operatively supporting said quill, and means for equalizing the driving pressure between said wheels and said disk.

4. A power transmitter having in combination a one-way rotatable disk, a shaft axially in intersecting relation therewith, a member rockably feathered to said shaft and loosely encircling the same, a pinion operatively supported by said member for rotation independent thereof and about an axis transverse the axis of the shaft, a pair of gears meshing with and on opposite sides of said pinion, a pair of friction wheels each of which is fixed to one gear of said pair, and means for operatively engaging said friction wheels and disk to transmit motion to the shaft.

5. A power transmitter having in combination, a rotatable disk, a shaft axially in intersecting relation therewith, a member shiftable on but rotatable with said shaft, and means for establishing a frictional driving relation between said disk and said member including a toggle mechanism permitting the shaft to run free when the toggle members are moved past alignment.

6. A power transmitter having in combination a rotatable disk, a shaft axially in intersecting relation with said disk, a quill feathered to said shaft, fixedly spaced apart friction wheels rotatably supported on said quill and operatively connected therewith by differential gearing, means for shifting the friction wheels transverse the axis of the disk, and means including a treadle operable toggle and a yielding stop associated with said toggle for driving the shaft from the disk and at will allowing the shaft to run free.

Signed at Hartford, county of Hartford, State of Connecticut, this 26th day of August, 1920.

HECTOR V. LOUGH.